Jan. 16, 1962  G. L. WARNER  3,017,581
REACTANCE TUBE CIRCUITS
Filed Nov. 6, 1958  2 Sheets-Sheet 1

INVENTOR
GERALD L. WARNER
BY H. Vincent Harsha
ATTORNEY

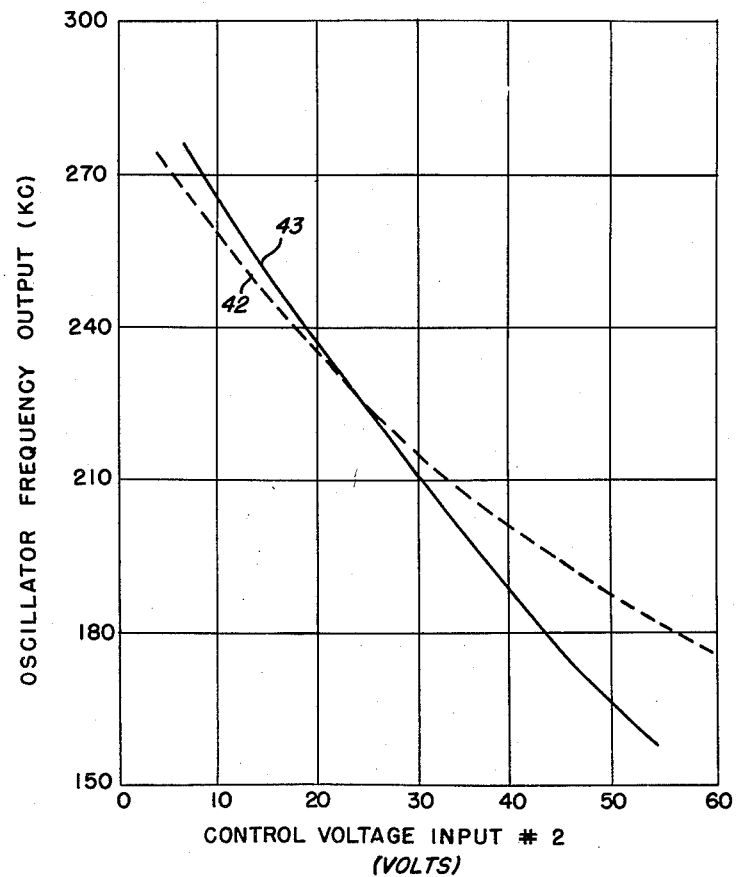

United States Patent Office 3,017,581
Patented Jan. 16, 1962

3,017,581
REACTANCE TUBE CIRCUITS
Gerald L. Warner, Sudbury, Mass., assignor to Raytheon Company, a corporation of Delaware
Filed Nov. 6, 1958, Ser. No. 772,655
6 Claims. (Cl. 331—180)

This invention relates generally to reactance tube circuits and, more particularly, to reactance tube circuits utilizing multiple, linearized, control inputs.

Conventional reactance tube circuits, such as those used in F-M transmitters, are used to vary the frequency of an oscillator. The reactance tube circuit is connected across the tuned circuit of the oscillator. Because the plate current of the tube is substantially 90° out of phase with the plate voltage, the reactance tube circuit acts as a variable capacitance with respect to the tuning circuit. A variation in the grid bias of the tube provides a variation in the magnitude of its capacitive reactance and, hence, a variation in the frequency of the oscillator. Conventionally, then, an audio signal may be applied at the grid of the reactance tube to vary the grid bias and, thus, to modulate the frequency of the oscillator. Usually, an automatic frequency control signal is fed back from the transmitter output to the grid of the reactance tube in order to correct the average frequency of the oscillator.

In some applications, it may be desirable to provide two control inputs to the reactance tube circuit so that the frequency may be varied in accordance with two control voltages simultaneously.

For example, one application of such a two-input reactance tube circuit may arise in missile circuitry utilizing doppler frequency techniques for providing information with respect to relative missile-target motion. One control signal, which may be a sweep voltage input signal, is used to cause the oscillator to vary over a particular range of frequencies in the vicinity of some average value of doppler frequency in order to provide correct tracking of the target. Another signal, which may be an integrated step voltage input signal, is used to cause the average oscillator frequency to change rapidly from one point in the doppler frequency spectrum to another in response to a rapid change in relative missile-target velocity. Such a rapid change in relative velocity may occur just subsequent to the launching of the missile because of the rapid increase in missile speed due to its booster rocket engines. The integrated step voltage control input provides a compensating shift in average frequency so that correct tracking is maintained by the sweep control input during the boost phase of the missile trajectory. To use the capabilities of the system adequately, it is desirable that the frequency changes in response to either of the control inputs be linear over the entire range of frequencies being used.

However, one of the difficulties which arises in using two input reactance tube circuits lies in the fact that, for use over wide frequency ranges, the change in frequency due to a change in voltage at either input is not linear over the frequency range desired. For instance, a change in input voltage may cause a greater frequency change at the high end of the frequency spectrum than at the low end. This invention provides an effective means for linearizing both inputs so that changes in frequency for particular changes in voltage from either input will be the same over substantially the complete frequency range being used. Linearity is accomplished with respect to one of the two inputs by providing a constant quiescent operating point for the tube by means of a Zener diode in the cathode circuit of the reactance tube. Such a configuration eliminates any degeneration that may occur due to biasing arrangements and, hence, linearizes the curve of frequency output vs. voltage input. Linearization is accomplished with respect to the other input by providing linearizing networks in shunt across the cathode resistor. Each of these networks becomes effective when the input voltage reaches predetermined levels. The points at which such linearizing networks become effective may be easily adjusted to provide a substantially linear curve of frequency output vs. input voltage for the other input.

The invention may be best understood with the help of the drawing in which:

FIG. 3 shows a graph of the frequency output vs. voltage input #2 from a second input source of control voltage.

Figure 1:
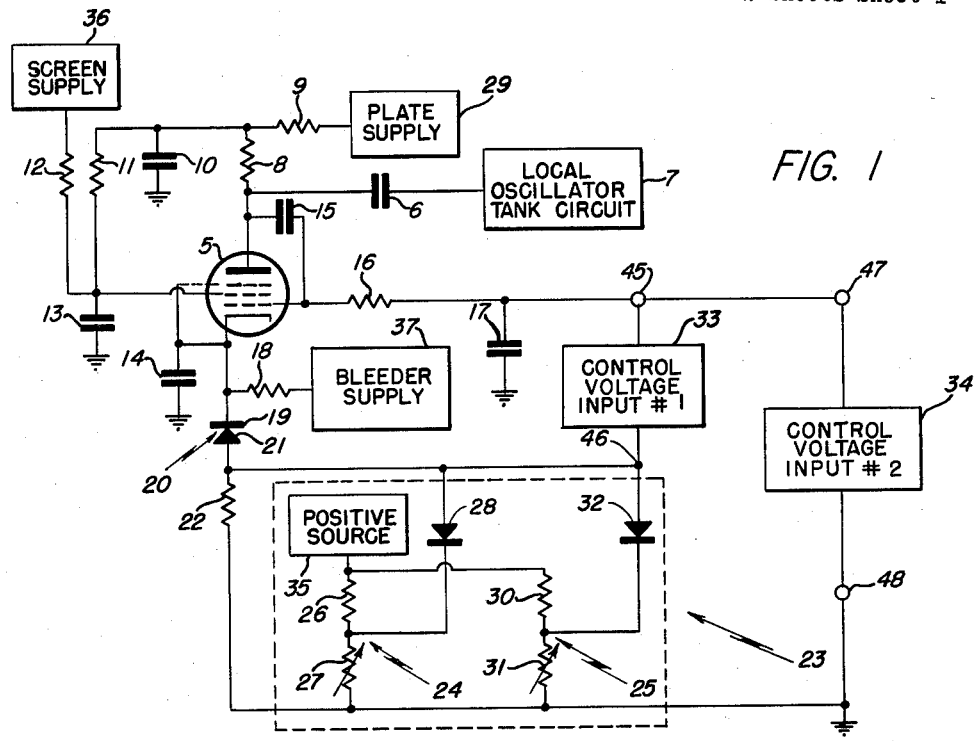
FIG. 1 shows a reactance tube circuit which is a particular embodiment of the invention.

The particular embodiment of the invention shown in FIG. 1 comprises a sharp-cutoff pentode tube 5, the plate of which is connected through coupling capacitor 6 to tank circuit 7 of a local oscillator. The anode of pentode 5 is connected to a positive voltage supply 29 through plate load resistor 8 and power supply decoupling resistor 9. Power supply decoupling capacitor 10 is connected from the junction of resistors 8 and 9 to ground. The junction point between the resistors 8 and 9 is also connected to one side of a screen biasing resistor 11, the other side of which is connected to screen supply 36 through a second screen biasing resistor 12. The junction point of resistors 11 and 12 is connected to the screen of pentode 5 and also to ground through a screen by-pass capacitor 13. The suppressor grid of pentode 5 is connected to the cathode. The cathode is by-passed to ground through cathode R-F by-pass capacitor 14. Phase shift capacitor 15 is connected between the plate and the control grid of pentode 5. The control grid is also connected to one side of phase shift resistor 16, the other side of which is connected to ground through grid R-F by-pass capacitor 17 and to a first terminal 45 of a source 33 of control voltage input #1. The cathode of pentode 5 is also connected to a bleeder supply 37 through a grid bleeder resistance 18. The cathode of pentode 5 is connected to the cathode 19 of Zener diode 20. The plate 21 of Zener diode 20 is connected to one end of cathode resistor 22, the other end of which is connected to ground. The junction point between Zener diode 20 and cathode resistor 22 is connected to a second terminal 46 of input source 33. A first terminal 47 of a second source 34 of control voltage input #2 is connected to the grid of pentode 5 through resistance 16 similar to terminal 45 of source 33. A second terminal 48 of input source 34 is connected to ground. A linearizing network 23 consisting of branches 24 and 25 is connected in shunt across cathode resistor 22. Branch 24 comprises a voltage divider made up of resistors 26 and 27 connected between a source 35 of positive voltage and ground. The junction point of resistors 26 and 27 is connected through a diode 28 to the ungrounded side of cathode resistor 22. Similarly, branch 25 comprising resistors 30 and 31 and diode 32 is connected in parallel with branch 24 across cathode resistor 22.

The purpose of the reactance tube circuit shown in FIG. 1 is to provide a change in frequency at the oscillator tank circuit that is proportional to a change in voltage input #1 from source 33 or a change in voltage input #2 from source 34. Local oscillator tank voltage from tank circuit 7 is fed to the plate of the reactance tube through coupling capacitor 6 and is phase shifted approximately 90° by capacitor 15 and resistor 16 before being fed to the grid. Since, in a pentode, the plate current is in phase with the grid voltage, this means that the plate current is 90° out of phase with the plate voltage. Thus, the plate circuit reflects a capacitive reactance to the tank circuit. The apparent capacity of the reactance tube is approximately $g_m RC$ where R equals the resistance of resistor 16, C equals the capacitance of capacitor 15, and $g_m$ is the grid-plate transconductance of the tube. The $g_m$ of the tube is dependent upon the grid to cathode bias, which, when varied, will change the capacity reflected to the tank circuit and, hence, change the frequency of the oscillator. The grid to cathode bias may be changed by applying an input from either input source 33 or input source 34.

In circuits used prior to this invention, a resistor is utilized in place of the Zener diode in the cathode circuit of the tube. In addition, linearizing network 23 is not utilized in prior art circuits. In prior art circuits, it was found that the curve of frequency output v. control voltage input for both input 33 and input 34 was non-linear over the frequency operating range of the reactance tube-oscillator combination. That is, the change in frequency for a particular change in input voltage was different at one end of the frequency spectrum than that at the other end of the frequency spectrum. It was desirable, therefore, to provide some means whereby the linearity could be improved for both control inputs.

The non-linearity of input 1 in prior art circuitry is caused by the D.-C. degeneration present due to the resistor previously used in place of the Zener diode of the invention. An increase in input voltage causes an increase in degeneration due to the increased current drawn. Therefore, a change occurs in the quiescent operating point of the tube over the frequency range of operation. In the circuit of this invention, however, Zener diode 20 is substituted for the resistor conventionally used in prior art circuits in order to eliminate degeneration and to hold the quiescent operating point of the tube at a particular predetermined value. The presence of the Zener diode causes the local oscillator frequency to be a linear function of the control voltage from input source 33.

Figure 2:
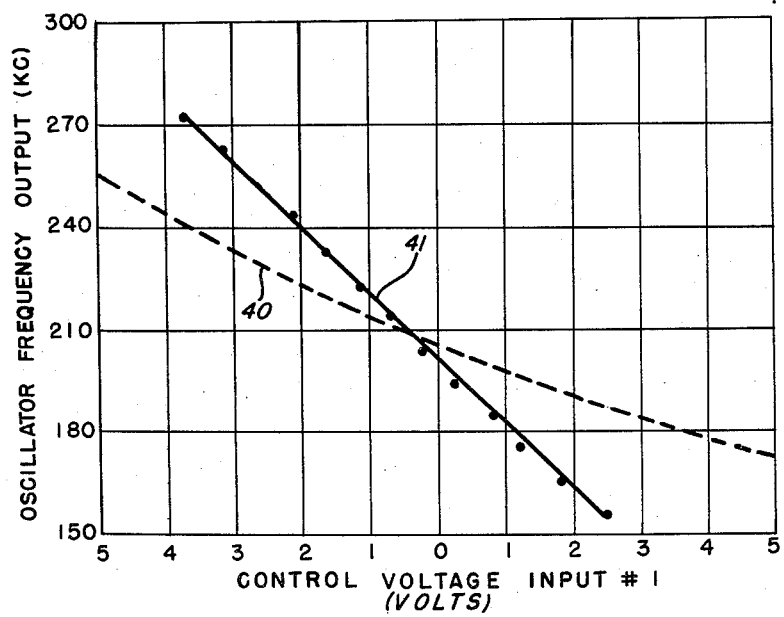
FIG. 2 shows a graph of frequency output vs. control voltage input #1 from one input source of control voltage.

The effect of the linearization of frequency output v. control voltage input No. 1 from input source 33 is shown more clearly in FIG. 2. In that figure, dashed line 40 shows the curve of frequency output v. control voltage input for control voltage No. 1 from source 33 for prior art circuits. Solid line 41 shows the improved characteristics of curve 40 after the Zener diode of the invention has been introduced into the circuit, as shown in FIG. 1. The increase in linearity is accompanied by an increase in sensitivity.

The effect of control voltage No. 2 on the operation of the reactance tube circuit is as follows. The voltage appearing across cathode resistor 22 is proportional to the current flowing through it, which, in turn, is proportional to $g_m$. The oscillator frequency is inversely proportional to the square of $g_m$. This factor causes prior art circuits to be non-linear with respect to the control voltage input No. 2 from source 34 because the grid voltage is approximately that appearing across cathode load resistor 22. The frequency output v. voltage input curve for input source 34 may be made more linear by the addition of linearizing networks in shunt across resistor 22. The shunt resistance networks 24 and 25 of FIG. 1 are switched in at predetermined voltage levels by the diodes 28 and 32 and provide predetermined loads across the cathode resistor at appropriate voltage levels required for linearization. If desired, a single linearizing branch may be used, or any larger number that may be required for the particular linearization problem at hand.

The effect of linearization of frequency output v. control voltage input No. 2 from source 34 is shown more clearly in FIG. 3. In that figure, dashed line 42 shows the frequency output v. control voltage input No. 2 from source 34 for the prior art circuits. Solid line 43 shows the improved characteristics of curve 42 after the linearizing network 23 has been added to the circuit.

In addition to the linearization of the response curves shown above, the invention provides other advantages over prior art circuitry. For instance, the Zener diode bias provides excellent stability with respect to supply voltage variations and maintains a very stable quiescent operating point for the tube. The elimination of the degeneration feedback with respect to input No. 1 from source 33 greatly increases the sensitivity of that input, and a greater controllable range of oscillator frequency is provided.

A conventional automatic frequency control signal may be fed back to the reactance tube circuit, as in conventional reactance tube applications, and applied between the same points as source 34 of control voltage input No. 1. For the sake of clarity, no AFC feedback loop is shown in FIG. 1.

The circuit shown in the drawing does not necessarily represent the only embodiment of the invention. Others will occur to those skilled in the art within the scope of the invention. Hence, the invention is not to be construed to be limited to that shown in the figures, except as defined by the appended claims.

What is claimed is:

1. Means for controlling the frequency of an oscillator having a tank circuit comprising a reactance circuit connected to said tank circuit of said oscillator for varying the reactance of said tank circuit; means connected to said reactance circuit for supplying a first control signal to said reactance circuit to provide a first predetermined variation in the frequency of said oscillator; means connected to said reactance circuit for supplying a second control signal having a larger voltage level than said first control signal to said reactance circuit to provide a second predetermined variation in the frequency of said oscillator, said reactance circuit including a first means for linearizing said first predetermined variation in frequency over a first predetermined frequency range, and a second means for linearizing said second predetermined variation in frequency over a second predetermined frequency range.

2. A reactance circuit for controlling the frequency of an oscillator having a tank circuit comprising a reactance tube connected to said tank circuit of said oscillator for varying the reactance of said tank circuit; a first input source connected to said reactance tube for supplying a first control signal to said reactance tube to provide a first predetermined variation in the frequency of said oscillator; a second input source connected to said reactance tube for supplying a second control signal having a larger voltage level than said first control signal to said reactance tube to provide a second predetermined variation in the frequency of said oscillator; a Zener diode connected to said reactance tube for linearizing said first predetermined variation in frequency over a first predetermined frequency range; and means connected to said Zener diode for linearizing said second predetermined variation in frequency over a second predetermined frequency range.

3. A reactance circuit for controlling the frequency of an oscillator having a tank circuit comprising a reactance tube having a grid circuit and a cathode circuit, said cathode circuit having first and second reference points, said reactance tube connected to said tank circuit of said oscillator for varying the reactance of said tank circuit; a first input source connected between the grid circuit and the first reference point of the cathode circuit of said reactance tube for supplying a first control signal to said reactance tube to provide a first predetermined variation in the frequency of said oscillator; a second input source connected between the grid circuit of said reactance tube and the second reference point of said cathode circuit for supplying a second control signal having a larger voltage level than said first control signal to said reactance tube to provide a second predetermined variation in the frequency of said oscillator; a Zener diode connected in the cathode circuit of said reactance tube for linearizing said first predetermined variation in frequency over a predetermined frequency range; and means connected between said first and second reference points for linearizing said second predetermined variation in frequency over said predetermined frequency range.

4. A reactance tube circuit for controlling the frequency of an oscillator having a tank circuit comprising a reactance tube having a grid circuit and a cathode circuit, said cathode circuit having a cathode, a cathode resistor, and first and second reference points, said reactance tube connected to said tank circuit of said oscillator for varying the reactance of said tank circuit; a first input source connected between the grid circuit and the first reference point of the cathode circuit of said reactance tube for supplying a first control signal to said reactance tube to provide a first predetermined variation in the frequency of said oscillator; a second input source connected between the grid circuit of said reactance tube and the second reference point of said cathode circuit for supplying a second control signal having a larger voltage level than said first control signal to said reactance tube to provide a second predetermined variation in the frequency of said oscillator; a Zener diode connected between the cathode and the cathode resistor of said reactance tube for maintaining the quiescent operating point of said tube at a predetermined value, whereby said first variation in frequency is a linear function of said first input signal over a predetermined frequency range; and a plurality of parallel adjustable networks connected in shunt with said cathode resistor for linearizing said second predetermined variation in frequency over said predetermined frequency range.

5. A reactance tube circuit for controlling the frequency of an oscillator having a tank circuit comprising a reactance tube having a cathode and a cathode resistor connected to a reference point, said reactance tube connected to said tank circuit of said oscillator for varying the reactance of said tank circuit; said first input source connected between the grid circuit and said cathode resistor of said reactance tube for supplying a first control signal to said reactance tube to provide a first predetermined variation in the frequency of said oscillator; said second input source connected between the grid circuit of said reactance tube and said reference point for supplying a second control signal having a larger voltage level than said first control signal to said reactance tube to provide a second predetermined variation in the frequency of said oscillator; a Zener diode having its cathode connected to said cathode of said reactance tube and its plate connected to said cathode resistor of said reactance tube for maintaining the quiescent operating point of said tube at a predetermined value, whereby said first variation in frequency is a linear function of said first input signal over a predetermined frequency range; and a plurality of parallel adjustable networks connected in shunt with said cathode resistor for linearizing said second predetermined variation in frequency over said predetermined frequency range.

6. A reactance tube circuit for controlling the frequency of an oscillator having a tank circuit comprising a reactance tube having a grid circuit and a cathode circuit, said cathode circuit having a cathode, a cathode resistor, and first and second reference points, said reactance tube connected to said tank circuit of said oscillator for varying the reactance of said tank circuit; a first input source connected between the grid circuit and a first reference point of the cathode circuit of said reactance tube for supplying a first control signal to said reactance tube to provide a first predetermined variation in the frequency of said oscillator; a second input source connected between the grid circuit of said reactance tube and a second reference point of said cathode circuit for supplying a second control signal having a larger voltage level than said first control signal to said reactance tube to provide a second predetermined variation in the frequency of said oscillator; a Zener diode connected between the cathode and the cathode resistor of said reactance tube for maintaining the quiescent operating point of said tube at a predetermined value, whereby said first variation in frequency is a linear function of said first input signal over a predetermined frequency range; a plurality of parallel adjustable networks each having a voltage divider network and a diode connected in shunt with said cathode resistor for linearizing said second predetermined variation in frequency over a predetermined frequency range.

References Cited in the file of this patent
UNITED STATES PATENTS

| | | |
|---|---|---|
| 2,382,436 | Marble | Aug. 14, 1945 |
| 2,731,600 | Stachura | Jan. 17, 1956 |